(12) United States Patent
Kothari et al.

(10) Patent No.: US 12,109,749 B2
(45) Date of Patent: Oct. 8, 2024

(54) PROCESS AND AN APPARATUS FOR MANUFACTURING BI-AXIALLY ORIENTED POLYESTER FILM FROM RPET

(71) Applicant: Polyplex Corporation Limited, Uttar Pradesh (IN)

(72) Inventors: Pranay Kothari, Uttar Pradesh (IN); Krishna Reddy, Uttar Pradesh (IN)

(73) Assignee: Polyplex Corporation Limited, Uttar Pradesh (IN)

( * ) Notice: Subject to any disclaimer, the term of this patent is extended or adjusted under 35 U.S.C. 154(b) by 410 days.

(21) Appl. No.: 17/439,579

(22) PCT Filed: Mar. 27, 2020

(86) PCT No.: PCT/IB2020/052943
§ 371 (c)(1),
(2) Date: Sep. 15, 2021

(87) PCT Pub. No.: WO2020/188548
PCT Pub. Date: Sep. 24, 2020

(65) Prior Publication Data
US 2022/0152904 A1    May 19, 2022

(30) Foreign Application Priority Data

Mar. 15, 2019   (IN) .............................. 201911010137

(51) Int. Cl.
*B29C 48/08*    (2019.01)
*B29C 48/00*    (2019.01)
(Continued)

(52) U.S. Cl.
CPC .......... *B29C 48/0018* (2019.02); *B29C 48/08* (2019.02); *B29C 48/21* (2019.02);
(Continued)

(58) Field of Classification Search
CPC ............ B29B 17/02; B29B 2017/0015; B29B 2017/0272; B29C 55/143; B29C 48/21;
(Continued)

(56) References Cited

U.S. PATENT DOCUMENTS 4,571,363 A   2/1986  Culbertson et al.
6,410,607 B1  6/2002  Ekart et al.
(Continued)

FOREIGN PATENT DOCUMENTS

EP    2039721      3/2009
WO    WO 97/44174  11/1997
(Continued)

OTHER PUBLICATIONS

International Search Report and Written Opinion in International Application No. PCT/IB2020/052943, dated Jul. 20, 2020, 15 pages.
(Continued)

*Primary Examiner* — Monica A Huson
(74) *Attorney, Agent, or Firm* — Fish & Richardson P.C.

(57) ABSTRACT

The present disclosure relates to a process for producing bi-axially oriented polyester (BOPET) film from the recycled polyethylene terephthalate (RPET) granules. The process involves preparing recycled PET (RPET) granules form post-consumer recycled PET (PCR PET) by depolymerization and polycondensation followed by preparing
(Continued)

the biaxially oriented polyethylene terephthalate (BOPET) film having recycled polyethylene terephthalate (RPET) up to 100%. The bi-axially oriented polyester film has good elongation, mechanical and/or thermal properties and are similar in quality to virgin PET films useful in high end food and pharma packaging and industrial applications.

13 Claims, 1 Drawing Sheet

(51) Int. Cl.
*B29C 48/21* (2019.01)
*B29C 55/14* (2006.01)
*C08J 5/18* (2006.01)
*C08J 11/24* (2006.01)
*B29K 67/00* (2006.01)
*B29K 105/26* (2006.01)
*B29L 7/00* (2006.01)

(52) U.S. Cl.
CPC .............. *B29C 55/143* (2013.01); *C08J 5/18* (2013.01); *C08J 11/24* (2013.01); *B29K 2067/003* (2013.01); *B29K 2105/26* (2013.01); *B29K 2995/0053* (2013.01); *B29L 2007/008* (2013.01); *C08J 2367/02* (2013.01)

(58) Field of Classification Search
CPC ... B29C 48/08; B29C 48/0018; B29C 55/005; B29C 55/12; C08J 11/24; C08J 5/18; C08J 2367/02; B29D 7/01; B29L 2007/008; Y02W 30/62; Y02W 30/80; Y02W 30/52; B29K 2995/0053; B29K 2105/26; B29K 2067/003; Y02P 20/582
See application file for complete search history.

(56) References Cited

U.S. PATENT DOCUMENTS

| 7,935,737 | B2 | 5/2011 | Gopal et al. |
| 8,465,842 | B2 | 6/2013 | Mohanty et al. |
| 2011/0028677 | A1 | 2/2011 | Mohanty et al. |
| 2012/0088112 | A1 | 4/2012 | Ito et al. |
| 2014/0186606 | A1 | 7/2014 | Bower et al. |
| 2021/0301126 | A1 | 9/2021 | Kothari et al. |

FOREIGN PATENT DOCUMENTS

| WO | WO 2001/019694 | 3/2001 |
| WO | WO 2009/083771 | 7/2009 |
| WO | WO 2020/031197 | 2/2020 |

OTHER PUBLICATIONS

International Preliminary Report on Patentability in International Application No. PCT/IB2020/052943, dated Mar. 5, 2021, 5 pages.
Anonymous, "MSDS MEG Mono Ethylene Glycol," BASF, Nov. 26, 2022, pp. 1-238.
Extended European Search Report in European Appln. No. 20772606. 8, dated Nov. 24, 2022, 4 pages.
Nadkarni, V. M., "Recycling of Polyesters," Chapter 26, Handbook of thermoplastic polyesters, Jan. 2002, vol. 2, 1-15.
Upasani et al., "Chemical recycling of PET flakes into yarn," Journal of Applied Polymer Science, Jul. 28, 2011, 123(1):520-525.

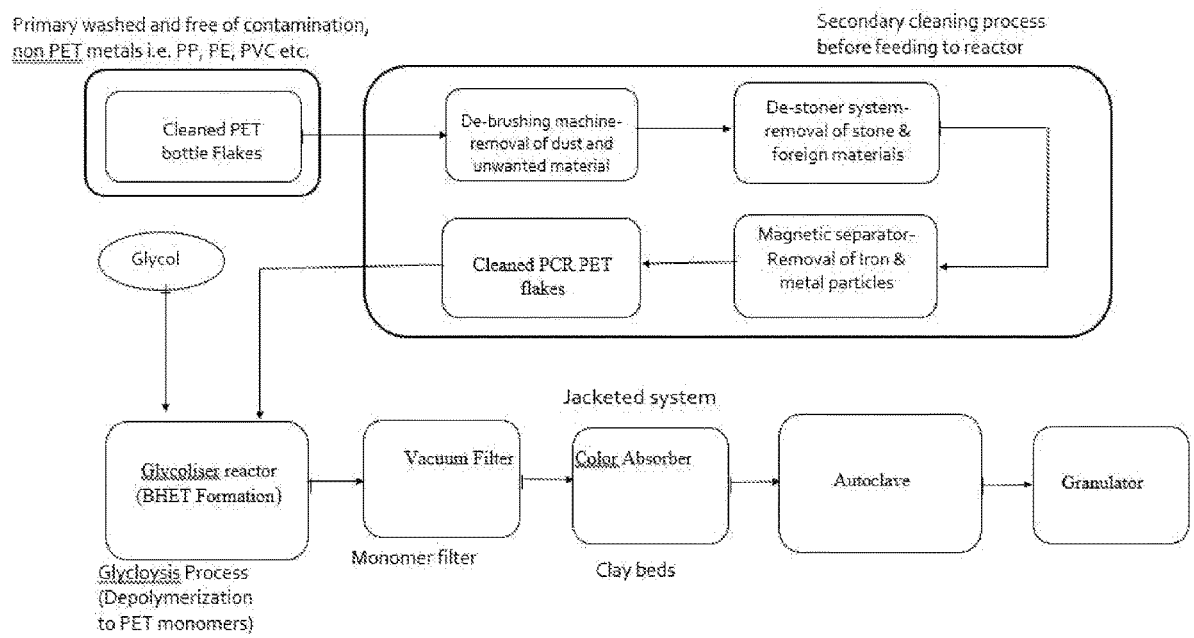

PROCESS AND AN APPARATUS FOR MANUFACTURING BI-AXIALLY ORIENTED POLYESTER FILM FROM RPET

PRIORITY CLAIM

The present application is a U.S. National Phase application under 35 U.S.C. § 371 of International Patent Application No. PCT/IB2020/052943, filed on Mar. 27, 2020, which claims priority to India Application No. 201911010137, filed on Mar. 15, 2019, the disclosure of each of which is incorporated herein by reference in its entirety.

FIELD OF THE INVENTION

The present disclosure relates to a process for producing bi-axially oriented polyester (BOPET) film from recycled polyethylene terephthalate (RPET). Particularly, the disclosure relates to RPET granules produced by depolymerisation of polyethylene terephthalate (PET) bottle flakes, amorphous PET (A-PET), crystalline PET (C-PET), polyester film and post-consumer recycled PET (PCR PET). The present process is capable to produce single or multilayer bi-axially oriented polyester film having uniform thickness, quality and properties like virgin PET films. The present disclosure also relates to an apparatus for producing the bi-axially oriented polyester film from the post consumer recycled polyethylene terephthalate (RPET).

BACKGROUND OF THE INVENTION

Polyethylene Terephthalate (PET) products are widely used, as beverage bottles, film, laminates, straps, high-grade sheet, fibers etc., and in medical supplies, especially syringes and containers. BOPET is a polyester film made from polyethylene terephthalate (PET). The BOPET is used for its properties of high tensile strength, chemical and dimensional stability, transparency, reflectivity, gas and aroma barrier properties, and electrical insulation.

The current commercially employed methods allow the use of post consumer recyclate (PCR) PET recycle only in low end applications. On the other hand, where higher quality processing is required, as in the manufacture of biaxially oriented polyester films, the recycling is restricted due to productivity and quality issues. PET products are widely used, as beverage bottles, for high-grade sheet and fibers, and in medical supplies, especially syringes and containers for instance. Attempts have been made to include the material in the recycling process as far as possible, but so far without avail in that it has been impossible to entirely decompose residual contaminants in the product. The current commercially employed methods allow the use of postconsumer PET recyclate only in applications with low-grade demands.

The BOPET film has application in various fields such as flexible packaging and food contact applications, insulating material, printing mediums, electronic and acoustic applications etc.

The BOPET are used in flexible packaging and food application as laminates containing metallized BOPET film, white BOPET web substrate is used as lidding for dairy goods, clear BOPET web substrate is used as lidding for fresh or frozen ready meals roasting bags, metallised films, laminated sheet metal (aluminum or steel) used in the manufacture of cans, BOPET sheets, straps, film etc.

One of the main requirements of the packaging material in food packaging application is that it must follow the food packaging compliance/standards. One of the main issues is migration of the chemicals and contaminants/foreign particles from packaging material to the food should never happen. Inventive BOPET film as per design of the manufacturing has no migration of chemicals and contaminants/foreign particles and hence it allows that inventive BOPET film meet the requirement of various food packaging compliance/standards. If the migration of chemicals and contaminants/foreign particles takes place, then the BOPET does not follow the food compliance/standards. Brand owners and customers are increasingly recognizing the urgency of recycling PET into food grade packaging The current technology uses very high amount of the virgin PET polymer and very less amount of the recycled PET in order to achieve the desired food compliance/standards. The current BOPET (in food applications) overcomes the problem of migration by increasing the amount of the virgin PET polymer used. Attempts have been made to include the material in the recycling process as far as possible, but so far without avail in that it has been impossible to entirely decompose residual contaminants in the product.

The problem associated with the current technology is that they use less recycled PET. Hence, the current processes are not environment friendly. Secondly the current technology needs virgin polymer to be used i.e. extra raw materials is needed.

Reference is made of US patent document U.S. Pat. No. 4,571,363, wherein the biaxially oriented polyester is produced. However, this document requires at least from 30% to 95% by weight of fresh polyester. Hence, to obtain the final biaxially oriented polyester a large amount of fresh or virgin polyester is required. This has impact on the environment and the cost is also very high.

Further reference is made to WO02001019694A1, wherein a polyester-based low-melting-point sealant layer is used in the food packaging. The packing has a complete layer, contacting the food, to be of virgin polyester. This document mandates to the layer contacting the food to be of fresh polyesters. Hence, there is a need to develop a process where in maximum possible recycled polyester can be used and to reduce the use of virgin polyester in BOPET film In view of the above, the inventors of the present disclosure felt a need to develop a process which overcomes all the problems of the prior arts and is cost effective. Particularly there is a need to increase the recycled PET in the reactant and reduce the virgin PET, to produce a BOPET which comply with the food safety standards. The process of the invention not only gives economic benefit but also addresses the environmental aspect. The present disclosure overcomes the problems of the current technology by the claimed process and apparatus. The present disclosure BOPET can be produced from even up to 90% RPET granules and also comply with the food compliance/standards.

It is the aim of the inventors to manufacturer a bi-axially oriented polyester film having recycled PET granules (RPET) as much as possible, up to 90% for food and pharma packaging standard.

Another objective of the present invention is to manufacture a bi-axially oriented polyester film having, up to 100% RPET granules, applicable for industrial application. Further, the present invention leads to recycle and up-cycle of post-consumer plastic waste.

In another objective, the present invention produces the RPET granules using the PET bottle flakes, PET film, along with Ethylene glycol (EG), terephthalic acid and other additives in esterification process.

In another objective, the present invention prevents the migration of the chemicals and contaminants/foreign particles on the film surface by filtration and de-colourisation.

Another objective of the present invention is to produce the food grade BOPET film from up to 90% recycled PCR PET.

Another objective of the present invention is to increase recycling of the PET for reducing the environmental impact.

Another objective of the present invention is to produce BOPET form an eco-friendly and cost-effective process.

Yet another objective of the present invention is to manufacturer a bi-axially oriented polyester film having, up to 100% RPET granules, applicable for industrial application.

Yet another objective of the present invention is to consume the post consumer PET plastic waste Yet another objective of the present invention is to up-cycling of the post consumer plastic waste Yet another objective of the present invention is to produce the RPET granules using the PCR PET bottle flakes along with Ethylene glycol (EG) and other additives in depolymerization process.

Yet another objective of the present invention is to remove the contaminants by filtration and de-colouration by using clay beds Yet another objective of the present invention is to prevent the migration of the chemicals and contaminants/foreign particles on the film surface by filtration and di-colouration.

SUMMARY OF THE INVENTION

The present disclosure discloses, first, a method of producing polyethylene-terephthalate recyclate (RPET) granules from PCR PET bottle flake, films, sheets, laminate, amorphous PET (A-PET), crystalline PET (C-PET), polyester film and post-consumer recycled PET (PCR PCT), and, second, manufacturing bi-axially oriented polyester film using the prepared RPET granules. The impurities from the granules are removed by the filtration process and decolourisation of the granules done by clay beds. The said process minimizes the waste generation in the process and/or to use the waste. The present process is capable to produce single or multilayer bi-axially oriented polyester film having uniform thickness. The RPET film product having similar quality like virgin PET Films. The BOPET film of present disclosure meets the requirement of various food packaging compliance/standards like FDA and EFSA.

The present disclosure also relates to an apparatus for producing the bi-axially oriented polyester film from the Polyethylene Terephthalate (RPET) granules. Further, the present disclosure leads to recycle and up-cycle of post-consumer PET plastic waste.

BRIEF DESCRIPTION OF THE DRAWINGS

FIG. 1—Illustrates a flow chart of the process according to the invention. The drawings referred to in this description are not to be understood as being drawn to scale except if specifically noted, and such drawings are only exemplary in nature.

DETAILED DESCRIPTION

While the invention is susceptible to various modifications and alternative forms, an embodiment thereof has been shown by way of example in the drawings and will be described here below. It should be understood, however that it is not intended to limit the invention to the particular forms disclosed, but on the contrary, the invention is to cover all modifications, equivalents, and alternative falling within the spirit and the scope of the invention.

The terms "comprises", "comprising", or any other variations thereof, are intended to cover a non-exclusive inclusion, such that a setup, structure or method that comprises a list of components or steps does not include only those components or steps but may include other components or steps not expressly listed or inherent to such setup or structure or method. In other words, one or more elements in a system or apparatus proceeded by "comprises . . . a" does not, without more constraints, preclude the existence of other elements or additional elements in the system or apparatus.

For the better understanding of this invention, reference would now be made to the embodiment illustrated in the accompanying Figures and description here below.

Furthermore, it is to be understood that the invention is not limited to the details of construction or process steps set forth in the following description. The invention is capable of other embodiments and of being practiced or being carried out in various ways.

Expressions "a", "an", "the", when used to define a term, include both the plural and singular forms of the term.

One embodiment of the invention relates to a process for preparing a biaxially oriented polyethylene terephthalate (BOPET) film comprising, the steps of preparing a recycled polyethylene terephthalate (RPET) granules, comprises depolymerization by glycolysis of a pre cleaned PET products to produce monomers, polycondensation of monomers in a polycondensation reactor or an autoclave to produce recycled PET (RPET) granules.

preparing the biaxially oriented polyethylene terephthalate film, comprises charging the RPET granules optionally along with a virgin PET-granules, to an extruder to obtain a molten polyethylene terephthalate, extruding the molten polyethylene terephthalate through a die, quenching the extruded polyethylene terephthalate on chilled rollers and stretching to obtain biaxially oriented polyethylene terephthalate film.

characterized in that, the glycolysis reaction is conducted in an esterification reactor by addition of glycol, at a temperature of 245-255° C. and at a pressure of 0.5-1 bar, and the RPET granules are up to 100% in the mixture of the RPET and virgin PET granules, charged to the extruder.

Another embodiment of the invention relates to the process, wherein the biaxially oriented polyethylene terephthalate obtained has at least three layers.

Yet another embodiment of the invention relates to the process, wherein the step of pre cleaning of PET products comprises the followings steps, primary washing of PET products by solvent to remove contamination, non PET metals such as poly propylene, poly ethylene, poly vinyl chloride.

de brushing the washed PET product for removal of dust and unwanted materials, de-stoning of the PET product for removal of the stones to obtain cleaned PET products.

Yet another embodiment of the invention relates to the process, wherein the step of film preparation comprises up to 95% of the recycled PET granules.

Yet another embodiment of the invention relates to the process, wherein the step of film preparation comprises up to 90% of the recycled PET granules.

Yet another embodiment of the invention relates to the process, wherein the step of pre cleaning of PET products comprises the followings steps,
   primary washing of PET products by solvent to remove contamination, non PET metals such as poly propylene, poly ethylene, poly vinyl chloride.
   de brushing the washing the PET product for removal of dust and unwanted materials,
   de-stoning of the PET product for removal of the stones to obtain cleaned PET products.

Yet another embodiment of the invention relates to the process, wherein the step of preparing the recycled polyethylene terephthalate (RPET) is followed by filtration for foreign particles removal and di-coloration, before the film preparation step.

Yet another embodiment of the invention relates to the process, wherein the PET products are selected from one or more films, sheets, laminate, bottles and flakes, amorphous PET (A-PET), crystalline PET (C-PET), polyester film and post-consumer recycled PET (PCR PCT).

Yet another embodiment of the invention relates to the process, wherein the autoclave temperature is 275-295° C. and the batch time is of 3-4 hrs.

Yet another embodiment of the invention relates to the process, wherein the autoclave reactor is maintained at vacuum and catalyst is added.

Yet another embodiment of the invention relates to the process, wherein the stretching involves
   machine direction stretching with stretch ratio of 3-3.5, and
   transverse direction stretching with stretch ratio of 3.8-4.2.

Yet another embodiment of the invention relates to the process, wherein the autoclave reactor is added with additives.

Yet another embodiment of the invention relates to the process, wherein the biaxially oriented polyethylene terephthalate (BOPET) is a food grade packaging film or pharma products packaging film.

Another embodiment of the invention relates to an apparatus for producing biaxially oriented polyethylene terephthalate (BOPET) film comprises,
   cleaning device for pre cleaning PET products to be recycled,
   esterification reactor for converting a pre cleaned PET product to a monomer,
   autoclave reactor operated at temperature of 275-295° C. and at vacuum pressure, for polycondensation of the monomers to obtain a recycled PET granules,
   extruders for extruding the recycled PET granules and optionally a virgin PET granules to obtain the molten polyethylene terephthalate (PET),
   chilled rollers for quenching the molten PET and stretching to obtain biaxially oriented polyethylene terephthalate,
characterized in that, the esterification reactor involves glycolysis reaction by addition of glycol, at a temperature of 245-255° C. and at a pressure of 0.5-1 bar, and the RPET granules are up to 100% in the mixture of the RPET and virgin PET charged to the extruder.

Yet another embodiment of the invention relates to the apparatus, wherein the cleaning apparatus comprises
   pre cleaning machine for washing, removing contamination and non-PET materials such as poly propylene, poly ethylene, poly vinyl chloride from the PET flakes,
   de brushing apparatus for removal of dust and unwanted materials,
   de stoning apparatus for the removal of the stones to obtain cleaned PET products.
   magnetic separator for removal of iron and other metal particles.

The dust is removed from RPET granules by filtration and decolourisation by using clay beds. The migration of the RPET on the film surface is prevented by filtration and de-colourisation.

The use of recycled PET in place of virgin/fresh resin results environmental impact and carbon footprint.

The present disclosure relates to a process of manufacturing bi-axially oriented polyester (BOPET) film from the Recycled Polyethylene Terephthalate (RPET) granules. Particularly, the disclosure relates to the RPET granules produced by depolymerisation of the PET bottle flakes/granules, PET film. The BOPET is manufactured with RPET as a raw material. The BOPET film of the present invention has recycled PET granules (RPET). The RPET may be up to 90% in the BOPET for food and pharma packaging application and up to 100% RPET granules applicable for industrial applications such as insulation.

The BOPET film of the present disclosure overcomes the problem of migration, on the film surface and manufactured film applicable for food packaging application, produced from up to 90% RPET granules. The RPET granules are produced by depolymerization of flakes in monomer in presence of ethylene glycol in esterified-glycolysis process and produce the granules after polycondensation. Further, the properties of granules are improved by filtration and decolourisation which prevent from the migration of the chemicals and contaminants/foreign particles.

Extruding the said molten polyester through a die and quenching the same on chilled rollers in order to obtain transparent polyester film.

PET bottle flakes charge in esterification reactor through feeding tank, under heating and in presence of Ethylene Glycol (EG) get depolymerised, form the 100% monomer batch in reactor and with time, pressure and temperature, additives are added get polymerised and produce the granules after polycondensation.

These granules go under filtration for dust removal and di-colouration for colour improvements.

RPET Granules Preparation:

PET bottled flake collected through vendors is fed into a tank through a jumbo bag. The flake then passes into feeding tank through which the flake passes to an esterification reactor maintained the pressure and temperature i.e. the PET bottle flakes are charged in esterification reactor through feeding tank, under heating.

Purified terephthalic acid (PTA) is added to flake in the esterification reactor. The reactor has an agitator that runs at high rpm during the process. The process condition for the esterification reactor is disclosed in Table 1. This reaction leads to depolymerised of PET bottle flakes and produce 100% monomer batch in the reactor. From the esterification reactor, the batch (monomer) passes to an autoclave reactor, in which polycondensation reaction takes place. The autoclave reactor is maintained at vacuum and additives is added to it. Additives are added to autoclave to prevent the colour of melt from turning yellow, under stirring of agitator. As the polycondensation reaction progresses the RPM of agitator is reduced, and the autoclave is pressurized with nitrogen to take out polymer melt. The polymer melt (RPET) is sent to cutting and drying. The RPET granules thus formed is tested for various properties namely ash content, IV, end group and haze which were found to be comparable with virgin PET.

TABLE 1

Process Parameter of Esterification Reactor

| Esterification Reactor Parameter | Virgin PET | R PET |
| --- | --- | --- |
| Temperature (° C.) | 245-255 | 245-255 |
| Pressure (bar) | 0.5-1 | 0.5-1 |
| RPM | 800-1200 | 800-1200 |
| Autoclave reactor temperature (° C.) | 275-295 | 275-295 |
| Batch time (hrs) | 3-4 | 3-4 |

TABLE 2

PET flakes properties

| S No. | Parameter | Unit | Values/Results |
| --- | --- | --- | --- |
| 1 | Intrinsic viscosity | dl/gm | 0.7-1.0 |
| 2 | Melting point | ° C. | 240-255 |
| 3 | PVC | ppm | <50 |
| 4 | Moisture | % | <1 |
| 5 | Bulk density | Kg/m3 | 250-350 |
| 6 | Wrong colors | ppm | <50 |
| 7 | Other contamination | ppm | <20 |
| 8 | Al/metal | ppm | <25 |
| 9 | Paper/lable/floatable/PE/PP | ppm | <20 |

Filtration and De-Coloration:

A filter used on the process to remove any impurities and ensure consistently high quality RPET granules. It improves the granules quality and improved the productivity.

Clay is used extensively for decolourisation purposes in the production of RPET granules. Clay used in a granular form in a fixed bed adsorber. The RPET granules are passed through the clay in the fixed bed absorber, which absorbs the colourants from the RPET granules. Surface area and good porosity of clay material make them useful adsorbent. The clay used in the process is Mineral clay like Bentonite which has good surface area and porosity.

BOPET Film Preparation:

The present disclosure relates to a process for preparing the bi-axially oriented polyester film, said process comprising the steps of charging of RPET granules produced, in main extruder and virgin granules in side extruder to obtain molten polyester, extruding, quenching and stretching the film to obtain the BOPET film. The film comprises three layers (e.g. an A/B/A or A/B/C) configuration. One and/or two layers in films comprise the silica.

The bi-axially oriented polyester film in particular include a multilayer structure such as A/B/A and/or A/B/C wherein the B-layer (core-layer) comprises polyethylene terephthalate layers of the film and contains recycled PET (RPET) and cap layers (A and/or C) comprises polyethylene terephthalate layers of the film and contains virgin PET granules with inorganic filler.

In the present disclosure, up to 90% RPET or even 100% uses to manufacturer the film applicable for food and pharma packaging application.

Presently disclosed bi-axially oriented polyester film is made of using 100% RPET granules i.e. core as well as cap layer made of RPET granules, applicable for the industrial applications.

TABLE 3

| | Film Processing Parameter | | | | |
| --- | --- | --- | --- | --- | --- |
| Film Grade | MDO Stretching Temperature (° C.) | MDO Draw Ratio | TDO stretching Temperature (° C.) | TDO crystallizing Temperature (° C.) | TDO Draw Ratio |
| RPET Film (A/B/A Layer) | 80-85 | 3-3.5 | 90-100 | 225-240 | 3.8-4.2 |

In one embodiment of the invention the film comprises three layers (e.g. an A/B/A or A/B/C) configuration. One and/or two layers in films comprise the silica.

The bi-axially oriented polyester film in particular include a multilayer structure such as A/B/A and/or A/B/C wherein the B-layer (core-layer) comprises polyethylene terephthalate layers of the film and contains recycled PET (RPET) and cap layers (A and/or C) comprises polyethylene terephthalate layers of the film and contains virgin PET granules with inorganic filler.

In the present invention, up to 90% RPET is used to manufacturer the film applicable for food and pharma packaging application.

Presently disclosed bi-axially oriented polyester film is made of using 100% RPET granules i.e. core as well as cap layer made of RPET granules, applicable for the industrial applications.

Environmental Benefits from Producing RPET

Producing the RPET film from the PET post consumer waste has the various environment benefits compare to virgin PET film. It reducing the carbon footprint and reducing the energy consumption in manufacturing of film, also reducing the usage of fossil feedstocks. It has the Life cycle analysis (LCA) advantage over virgin PET film, recycling 1 tons of plastic bottles saves 1.5 tonnes of $CO_2$ in reference to landfill or incineration. It also reduces the green house gases (GHG) and energy use compare to virgin PET film. Land and ocean pollution The said bi-axially oriented polyester film has good elongation, mechanical and thermal properties and useful in high end food and pharma packaging and industrial applications.

The invention itself, together with further features and attended advantages, will become apparent from consideration of the following detailed description, taken in conjunction with the accompanying drawings. One or more embodiments of the present invention are now described, by way of example.

EXAMPLES

Examples 1

Various batches of RPET produced by the method of the present disclosure are analyzed for the properties like IV, COOH, Ash and DEG. The properties of RPET are comparable to the virgin PET. Hence, up to 90% RPET can be used to manufacture the film applicable for food or pharma packaging application.

TABLE 4

Test Results

| RPET | IV | COOH | ASH | DEG | Virgin PET | IV | COOH | ASH | DEG |
|---|---|---|---|---|---|---|---|---|---|
| 1 | 0.643 | 23.64 | 0.057 | 1.691 | 1 | 0.631 | 27.6 | 0.006 | 1.094 |
| 2 | 0.643 | 25.5 | 0.022 | 1.924 | 2 | 0.64 | 26.5 | 0.016 | 1.16 |
| 3 | 0.646 | 24.74 | 0.021 | 1.172 | 3 | 0.628 | 31.6 | 0.024 | 1.04 |
| 4 | 0.642 | 23.93 | 0.014 | 1.72 | 4 | 0.623 | 28.31 | 0.01 | 1.208 |
| 5 | 0.639 | 23.5 | 0.018 | 1.827 | 5 | 0.626 | 32.58 | 0.022 | 1.036 |
| Average | 0.6426 | 24.262 | 0.0264 | 1.6668 | Average | 0.6296 | 29.318 | 0.0156 | 1.1076 |

Example 2

Comparison Between Virgin and RPET Film Properties:

The biaxially oriented PET film produced by the process of the invention (involving recycled PET) is compared with the biaxially oriented PET film produced from the virgin PET. Mechanical properties like tensile strength, elongation at break of rPET films are similar to virgin PET film. Similarly optical, surface properties and performances are also comparable with virgin PET film. The results are summarized in the below table.

TABLE 5

Result Comparison

| Properties | Test Method | Unit | Standard PET | 70% rPET | 90% rPET |
|---|---|---|---|---|---|
| Nominal Thickness | Standard Method | Micron | 12 + 0.5 | 12 + 0.5 | 12 + 0.5 |
|  |  | Gauge | 48 + 2 | 48 + 2 | 48 + 2 |
| Yield | Standard Method | m2/kg | 60 + 5 | 60 + 5 | 60 + 5 |
|  |  | in2/lb | 42000 | 42000 | 42000 |
| Tensile Strength-MD | ASTM D-882 | kg/cm2 | 2200 + 500 | 2200 + 500 | 2200 + 500 |
|  |  | kpsi | 31.3 | 31.2 | 31.2 |
| Tensile Strength-TD | ASTM D-882 | kg/cm2 | 2300 + 500 | 2300 + 500 | 2300 + 500 |
|  |  | kpsi | 32.7 | 32.5 | 32.5 |
| Elongation at Break-MD | ASTM D-882 | % | 130 + 25 | 130 + 25 | 130 + 25 |
| Elongation at Break-TD | ASTM D-882 | % | 125 + 25 | 125 + 25 | 125 + 25 |
| Heat Shrinkage (At 150 Degree C. for 30 mins) | | | | | |
| MD | ASTM D-1204 | % | 2 + 0.5 | 2 + 0.5 | 2 + 0.5 |
| TD | ASTM D-1204 | % | 0.2 + 0.5 | 0.2 + 0.5 | 0.2 + 0.5 |
| Co-efficient of Friction, A/B | | | | | |
| Static | ASTM D-1894 |  | 0.52 + 0.5 | 0.52 + 0.5 | 0.52 + 0.5 |
| Dynamic | ASTM D-1894 |  | 0.42 + 0.5 | 0.42 + 0.5 | 0.42 + 0.5 |
| Surface Tension | | | | | |
| Plain Side | ASTM D-2578 |  | 44 + 4 | 44 + 4 | 44 + 4 |
| Corona Side | ASTM D-2578 |  | 56 + 4 | 56 + 4 | 56 + 4 |
| Optical Properties | | | | | |
| Haze | ASTM D-1003 | % | 2.3 + 0.5 | 2.3 + 0.5 | 2.3 + 0.5 |

Mechanical properties like tensile strength, elongation at break of RPET films are similar to virgin PET film. Similarly, optical, surface properties and performances are also comparable with virgin PET film. Hence, the process of the present invention makes the usage of RPET up to 90% to produce a food grade biaxially oriented PET.

Advantages:

The BOPET disclosed in the present disclosure provide the following advantages:
The BOPET film of present disclosure meets the requirement of various food packaging compliance/standards like food and drug administration (FDA) and European food safety authority (EFSA).
Up to 100% RPET may be used in the film manufacturing.
No issue of the migration of the contaminants/dust on the film surface.
Remove the impurities by filtration and de-colouration by clay beds.
Uses more recycled PET and less or no virgin PET.
Environment friendly.
Economical process.

The invention claimed is:

1. A process for preparing a biaxially oriented polyethylene terephthalate (BOPET) film comprising, the steps of
preparing a recycled polyethylene terephthalate (RPET) granules, comprises
depolymerization by glycolysis of a pre cleaned PET products to produce monomers,
polycondensation of monomers in a polycondensation reactor or an autoclave to produce recycled PET (RPET) granules,
preparing the biaxially oriented polyethylene terephthalate film, comprises
charging the RPET granules optionally along with a virgin PET granules, to an extruder to obtain a molten polyethylene terephthalate,
extruding the molten polyethylene terephthalate through a die,
quenching the extruded polyethylene terephthalate on chilled rollers and stretching to obtain biaxially oriented polyethylene terephthalate film,
characterized in that, the glycolysis reaction is conducted in an esterification reactor by addition of glycol, at a temperature of 245-255° C. and at a pressure of 0.5-1 bar, and the RPET granules are charged to the extruder up to 100% for industrial applications in the mixture of the RPET and virgin PET granules, charged to the extruder or up to 90% for food or pharma packaging applications in the mixture of the RPET and virgin PET granules, charged to the extruder.

2. The process as claimed in claim 1, wherein the biaxially oriented polyethylene terephthalate obtained has at least three layers.

3. The process as claimed in claim 1, wherein the biaxially oriented polyethylene terephthalate is an A/B/A or A/B/C configuration, the B layer comprises biaxially oriented polyethylene terephthalate film made from the recycled PET (RPET) and cap layers A and/or C, comprises biaxially oriented polyethylene terephthalate film, made from virgin PET granules, along with inorganic filler.

4. The process as claimed in claim 1, wherein the step of pre cleaning of PET products comprises the followings steps,
   primary washing of PET products by solvent to remove contamination, non PET materials selected from poly propylene, poly ethylene, and poly vinyl chloride,
   de brushing the washed PET product for removal of dust and unwanted materials,
   de-stoning of the PET product for removal of the stones to obtain cleaned PET products.

5. The process as claimed in claim 1, wherein the step of preparing the recycled polyethylene terephthalate (RPET) is followed by filtration for foreign particles removal and de-coloration, before the film preparation step.

6. The process as claimed in claim 1, wherein the PET products are selected from one or more films, sheets, laminate, bottles and flakes, amorphous PET (A-PET), crystalline PET (C-PET), polyester film and post-consumer recycled PET (PCR PCT).

7. The process as claimed in claim 1, wherein the autoclave temperature is 275-295° C. and the batch time is of 3-4 hrs.

8. The process as claimed in claim 1, wherein the autoclave reactor is maintained at vacuum and catalyst is added.

9. The process as claimed in claim 1, wherein the stretching involves
   machine direction stretching with stretch ratio of 3-3.5, and
   transverse direction stretching with stretch ratio of 3.8-4.2.

10. The process as claimed in claim 1, wherein the autoclave reactor is added with additives.

11. The process as claimed in claim 1, wherein the biaxially oriented polyethylene terephthalate (BOPET) is a food grade packaging film or pharma products packaging film.

12. An apparatus for producing biaxially oriented polyethylene terephthalate (BOPET) film comprises,
   cleaning device for pre cleaning PET products to be recycled,
   esterification reactor for converting a pre cleaned PET product to a monomer,
   autoclave reactor operated at temperature of 275-295° C. and at vacuum pressure, for polycondensation of the monomers to obtain a recycled PET granules,
   extruders for extruding the recycled PET granules and optionally a virgin PET granules to obtain the molten polyethylene terephthalate (PET),
   chilled rollers for quenching the molten PET and stretching to obtain biaxially oriented polyethylene terephthalate,
   characterized in that, the esterification reactor involves glycolysis reaction by addition of glycol, at a temperature of 245-255° C. and at a pressure of 0.5-1 bar, and
   the RPET granules are charged to the extruder up to 100% for industrial applications in the mixture of the RPET and virgin PET granules charged to the extruder or up to 90% for food or pharma packaging applications in the mixture of the RPET and virgin PET granules, charged to the extruder.

13. The apparatus as claimed in claim 12, wherein the cleaning apparatus comprises
   pre cleaning machine for washing, removing contamination and non-PET materials selected from poly propylene, poly ethylene, and poly vinyl chloride from the PET flakes,
   de brushing apparatus for removal of dust and unwanted materials,
   de stoning apparatus for the removal of the stones to obtain cleaned PET products,
   magnetic separator for removal of iron and other metal particles.

* * * * *